United States Patent

Rauterkus et al.

[11] 3,714,098
[45] Jan. 30, 1973

[54] PROCESS FOR THE MANUFACTURE OF AQUEOUS DISPERSIONS OF VINYL ESTERS

[75] Inventors: Karl Josef Rauterkus, Kelkheim/Taunus; Detlev Seip, Konigstein/Taunus, both of Germany

[73] Assignee: Farbwerke Hoechst Aktiengesellschaft vormals Meister Lucius & Bruning, Frankfurt/Main, Germany

[22] Filed: June 26, 1970

[21] Appl. No.: 50,294

Related U.S. Application Data

[63] Continuation-in-part of Ser. No. 679,535, Oct. 31, 1967, abandoned.

[30] Foreign Application Priority Data

Nov. 8, 1966   Germany..........................F 50 623

[52] U.S. Cl...............260/29.6 RW, 260/29.6 WB, 260/29.6 WA, 260/29.6 T, 260/29.6 TA, 260/29.6 MN, 260/29.6 ME
[51] Int. Cl................................................C08f 1/13
[58] Field of Search ..260/29.6 ME, 29.6 TA, 29.6 T, 260/17 R, 29.6 MN, 29.6 RW, 29.6 WA, 29.6 WB; 204/159.22

[56] References Cited

UNITED STATES PATENTS

| 3,150,110 | 9/1964 | Becker et al | 260/29.6 ME |
| 3,320,198 | 5/1967 | Hill | 260/29.6 TA |
| 3,324,056 | 6/1967 | Vona et al. | 260/29.6 ME |
| 3,405,085 | 10/1968 | Girg et al. | 260/29.6 ME |

OTHER PUBLICATIONS

C.A., Vol. 58, (1963), pp. 1,556(b)

Primary Examiner—William H. Short
Assistant Examiner—L. M. Phynes
Attorney—Curtis, Morris & Safford

[57] ABSTRACT

A process for the production of aqueous dispersions of polymers of vinyl esters by emulsion-polymerizing at least one vinyl ester and/or an ester of acrylic acid and/or an ester of methacrylic acid in the presence of light-sensitive emulsifiers of the formula

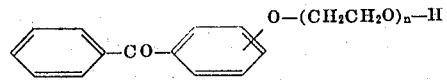

said polymers giving cross-linked products under the action of light of a wave-length of from 2,000 to 8,000 A.

7 Claims, No Drawings

PROCESS FOR THE MANUFACTURE OF AQUEOUS DISPERSIONS OF VINYL ESTERS

This application is a continuation-in-part of U.S. application Ser. No. 679,535 filed Oct. 31, 1967, now abandoned.

The present invention relates to a process for the manufacture of dispersions.

It has already been proposed to use aqueous dispersions of homo- and copolymers for the manufacture of coatings, of textile impregnating agents, as binders for paints and in numerous other fields of application. As regards the possible uses of these dispersions in practice it is important, inter alia, that they have a good film-forming property. Moreover, textile impregnations or coatings obtained with these dispersions should meet the requirements in each case regarding fastness to solvents, and coats of paint obtained with the dispersions should have a good weathering resistance, a good fastness to solvents and alkalies and should only exhibit a low sensitivity to water.

It has also been proposed to use aqueous dispersions of copolymers, which still contain reactive groups by which cross-linking is brought about, for the manufacture of coatings and coats of paints. For example, aqueous dispersions of self-cross-linking copolymers can be obtained by copolymerizing in an aqueous emulsion derivative of acrylamide, glycidyl acrylates and similar compounds with other olefinically unsaturated monomers. Under the influence of heat and/or acid catalysts, the aforesaid copolymers can be converted to cross-linked insoluble products. However, it has been found that the aforementioned copolymers are in many cases already pre-cross-linked to a considerable extent and that, moreover, the dispersions have an insufficient stability to withstand storage.

Since the pre-cross-linked latex particles contained in the aforesaid dispersions are harder and have a lower flow, the dispersions have an insufficient film-forming capacity. However, in order to attain the aforesaid properties of the coatings, films and the like made from dispersions of cross-linkable copolymers, it is often of decisive importance that cross-linking sets in only after the formation of the film. Moreover, for many purposes the temperature required for cross-linking is too high.

It has been proposed, moreover, to prepare aqueous dispersions of homo- and copolymers which are distinguished by an increased stability by carrying out the polymerization of the monomer or the monomers in the presence of a suitable dispersing agent. For example, when using non-ionic dispersing agents, such as alkylated aromatic hydroxy compounds, which have been hydroxyethylated, dispersions are obtained which are distinguished by a high stability, a good compatibility with pigments and a good freeze-thaw resistance. The dispersing agents contained in these dispersions exhibit a plasticizing action on the polymer which is desirable in many cases. However, the presence of these dispersing agents entails the disadvantage that they impart a relatively high sensitivity to water to films made from these dispersions.

Consequently, there exists a great demand in industry for polymers whose dispersions are capable of withstanding storage for an unlimited period of time and whose films can be cross-linked after drying already at room temperature under mild conditions.

Now we have found a process for the manufacture of aqueous dispersions having improved properties by emulsion-polymerization of vinyl esters, for example esters of vinyl alcohol and linear or branched aliphatic carboxylic acids having one to 18 carbon atoms, especially vinyl acetate and vinyl esters of saturated aliphatic monocarboxylic acids branched in α-position and having four to 11 carbon atoms, acrylic acid esters and methacrylic acid esters, for example esters of acrylic acid and methacrylic acid with linear or branched monohydric aliphatic saturated alcohols having one to 18, preferably four to eight, carbon atoms, singly or in admixture with one another, if necessary of desired together with a further amount of up to 50 percent, calculated on the weight of the total monomer mixture, of at least one olefinically unsaturated monomer copolymerizable with said ester, such as ethylene, isobutylene and higher α-olefins having preferably up to 12 carbon atoms, styrene, acrylonitrile, maleic acid esters and fumaric acid esters, for example esters of maleic acid or fumaric acid and saturated aliphatic monohydric alcohols having one to 10, preferably four to eight carbon atoms, in the presence of the conventional free radical polymerization catalysts, which comprises carrying out the polymerization in the presence of at least one light-sensitive non-ionic emulsifier of the formula

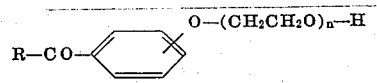

wherein R represents a phenyl group, $n$ represents an integer within the range of 1 to 200, preferably 4 to 60, if necessary or desired in mixture with emulsifiers and/or protective colloids known per se.

The light-sensitive non-ionic emulsifiers used in accordance with the present invention can be prepared by hydroxyethylation of phenolic compounds as disclosed by K. Lindner "Tenside-Textilhilfsmittel-Waschrohstoffe," Stuttgart 964, Vol. 1, pg. 882.

By the process according to the present invention, in which generally the light-sensitive non-ionic emulsifier or emulsifiers are used in an amount within the range of from 1 to 15 percent, calculated on the weight of the monomer or monomers, there are obtained dispersions in which not only the water-soluble emulsifier but also the polymer portion are non-cross-linked. Unexposed films made from the dispersions are completely soluble in the conventional organic solvents. Moreover, the films exhibit a high sensitivity to water which is undesirable for many purposes.

However, if the films, coatings or coats of paint made from the dispersions obtained by the process of the present invention are exposed to the action of light of a wave length within the range of from 2,000 to 8,000 A, cross-linked products are obtained. By the cross-linking process the hydrophobic part of the light-sensitive non-ionic emulsifiers is strongly bound to the latex particles and the emulsifier can, therefore, no longer be washed out.

The surprising observation was made that by the cross-linking process also a possible present portion of a protective colloid is strongly bound so that also this protective colloid portion, after a film or coating formed from the dispersion has been exposed to a suitable radiation, can no longer be extracted with water. Exposed films, coatings and the like obtained from the dispersions prepared according to the present invention have, in addition to an improved fastness to solvents, many other decisive advantages. While, for example, an unexposed film is strongly attacked by alkalies within a short period of time, it swells and entirely loses its original shape, a film that has been cross-linked under the action of luminous rays can be exposed for 14 days to the action of alkalies at a temperature of 70°C without losing its shape and aspect. Furthermore, the tensile strength is increased by the exposure to radiation and, in the case of pigmented films, the pigment is no longer washed out to such an extent as is the case with uncross-linked pigmented films.

The dispersions are prepared in the presence of the conventional water-soluble free radical polymerization catalysts, for example the salts of persulfuric acid or hydrogen peroxide as well as the water-soluble derivatives of hydrogen peroxide, for example sodium peroxide, or water-soluble azo compounds, for example $\alpha, \alpha'$-azo-($\alpha$-methyl-$\gamma$-sulfo)-butyric-acid-dinitrile; $\alpha, \alpha'$-azo-($\alpha$-methyl-$\gamma$-diethylamino)-butyric-acid-aciddinitrile; $\gamma, \gamma'$-azo-($\gamma$-cyano)-valeric-acid or 2,2'-azo-(2-methylpropion-amidine). Moreover, there may also be used the redox systems usually employed for emulsion polymerizations, for example the systems sodium bisulfite/ammonium persulfate, formaldehyde sodium sulfoxylate/hydrogen peroxide or ascorbic acid/hydrogen peroxide.

As emulsifiers there may be used, in addition to the non-ionic, light-sensitive compounds to be used according to the invention, also non-ionic, anionically active and cationically active emulsifiers known per se, as well as combinations of these emulsifiers. The weight of the known emulsifier, which may be used concomitantly, should not exceed the weight of the light-sensitive emulsifiers of the invention.

As protective colloids there may also be used high molecular weight compounds, such as polyvinyl alcohol, polyvinyl pyrrolidone, cellulose derivatives, polyacrylamide or polymethacrylamide. The weight of the protective colloids, which are possibly used concomitantly, should not exceed the weight of the light-sensitive emulsifiers of the invention. If there are to be used, in addition to the light-sensitive emulsifiers of the invention, not only emulsifiers known per se but also protective colloids, the total weight of the two last-mentioned compounds should not exceed the weight of the light-sensitive emulsifiers.

In order to attain an even better stabilization of the dispersion, there may be incorporated by polymerization up to 5 percent, calculated on the weight of the total mixture of monomers, of at least one unsaturated carboxylic acid or the alkali salt thereof, such as acrylic acid and methacrylic acid or vinyl sulfonic acid and vinyl phosphonic acid or the alkali salts thereof, for example the sodium- or potassium salts thereof.

The polymerization is generally carried out at a pH value of from 3 to 9 and at a temperature of from approximately 20° to 90°C.

The dispersions obtained by the process of the present invention may be used, for example, as pigment binders for the coating of sheets and papers, for the manufacture of bright-drying polish emulsions and for textile finishes.

The following examples serve to illustrate the invention, but they are not intended to limit it thereto, the parts being by weight.

EXAMPLE 1

The solution of 12 parts of a hydroxyethylation product of one mole para-hydroxybenzophenone with 14 moles ethylene oxide, 0.15 part of the sodium salt of vinyl sulfonic acid, 0.25 part of sodium acetate, 1.5 parts of poly-N-vinyl-2-pyrrolidone and 0.42 part of potassium persulfate was heated in 109 parts of water to 80°C in a glass vessel provided with thermometer, agitator, reflux condenser and dropping funnel. The mixture of monomers of 67 parts of vinyl acetate and 33 parts of vinyl ester of a mixture of aliphatic carboxylic acids branched in $\alpha$-position and having nine to 11 carbon atoms (boiling point: 205° to 262°C under 760 mm Hg pressure) was then added dropwise to the solution during the course of 3 hours. The addition being terminated, the solution of 0.1 part potassium in 5 parts water was added to the reaction mixture and the whole was heated for a further 2 hours. The reaction mixture was then cooled to room temperature.

There was obtained a medium-disperse dispersion free from coagulate which was freeze-thaw resistant and compatible with pigments, which had a solid content of approx. 50 percent by weight and viscosity (measured in the Hoeppler viscosimeter at 20°C) of 0.8 poise. The dispersion dried to form a clear, homogeneous and elastic film which was completely soluble in the conventional organic solvents. The water-extractable portion of such a film amounted to approx. 6 percent, calculated on the weight of solid material. However, if a film (having a thickness of about 0.8 mm) was exposed to the radiation of an ultraviolet lamp, a xenon lamp or to daylight, cross-linking was brought about which reduced not only the portion soluble in organic solvents but also the water-soluble portion. For example, if a film (0.8 mm) was irradiated for 7 hours with the rays of a xenon lamp and then treated for 4 hours with boiling water, there could only be dissolved 1 percent by weight of a water-soluble portion out of the film. When the film was exposed for 12 hours to the radiation of a xenon lamp and then treated for 4 hours in boiling acetone, there was obtained an insoluble portion (gel fraction) of 59 percent by weight. The tensile strength of a film exposed for 1 hour to the radiation of a xenon lamp increased by 40 percent as compared to the tensile strength of an unexposed film. An unexposed film lost its form under the action of alkalies, it swelled and decomposed, while an exposed film entirely maintained its shape and aspect in 1N potassium hydroxide (10 days at 70°C). The pigment binding capacity of cross-linked films was higher than that of un-cross-linked films. In the latter case a white-pigmented film (40 parts $TiO_2$, 52 parts $BaSO_4$, 5 parts talcum, 3 parts chalk) completely gave off the pigment in acetone. Owing to the cross-linking reaction, the major part of the pigment was retained, and the pigment was dissolved out to a minor extent only.

EXAMPLE 2

The dispersion was prepared according to the recipe as given in Example 1 except that, instead of the hydroxyethylation product of 1 mole para-hydroxybenzophenone with 14 moles ethylene oxide, there were used 12 parts of a hydroxy-ethylation product of 1 mole para-hydroxybenzophenone with 30 moles ethylene oxide. There was obtained a medium-disperse dispersion which was free from coagulate, freeze-thaw resistant and compatible with pigments which had a solid content of about 50 percent by weight and a viscosity (measured in the Hoeppler viscosimeter at 20°C) of 8.7 poises. The properties of a film obtained from the dispersion corresponded, as regards cross-linkability, entirely to those indicated in Example 1.

Prior to cross-linking, 6 percent by weight of the solid substance could be dissolved out of a film with water, whereas after the cross-linking process (7 hours' exposure to the radiation of a xenon lamp), only 1 percent by weight of the solid substance could be dissolved out of a film. After the film had been exposed to radiation for 12 hours and boiled in acetone for 4 hours, the gel fraction amounted to 46 percent by weight. When the film was exposed for one hour to the radiation of a xenon lamp, the tensile strength increased by by 28 percent. The resistance to alkalies and the pigment binding capacity were improved by the cross-linking process in the same manner as described in Example 1.

EXAMPLE 3

In the manner described in Example 1, a dispersion was prepared except that instead of 33 parts of vinyl esters of aliphatic carboxylic acids branched in α-position and having 9 to 11 carbon atoms, 33 parts of maleic acid di-n-butyl ester were used. A film made from the 50 percent dispersion was soluble in the usual organic solvents, the water-extractable portion amounted to 5.3 percent. After having been exposed to the radiation of a xenon lamp for 1 hour, the water-extractable portion was reduced to about 1.1 percent.

EXAMPLE 4

A 5 liter autoclave provided with temperature regulation and stirrer was charged with a solution of 38 grams of hydroxyethylated poly (propylene oxide) having a molecular weight of 1,750 with 65 percent of ethylene oxide, 24.5 grams of a hydroxyethylation product of 1 mole of p-hydroxybenzophenone with 14 moles of ethylene oxide, 14 grams of sodium dodecylbenzene sulfonate, 9 grams of the sodium salt of vinylsulfonic acid, 4.2 grams of disodium pyrophosphate and 1,200 grams of water. The autoclave was scavenged with nitrogen and ethylene to remove all oxygen. The stirrer was then set in motion at a speed of 140 revolutions per minute and the contents of the autoclave were heated at 80°C. During heating, ethylene was introduced until the pressure in the autoclave had risen to 20 atmospheres. At an internal temperature of 80°C, 125 grams of vinyl acetate and 25 percent of the catalyst solution of 5.5 grams of potassium persulfate and 150 grams of water were rapidly added to the reaction mixture. Polymerization set in after a few minutes perceptible by an increase in the internal temperature. At an internal temperature of 80°C and under an ethylene pressure of 20 atmospheres, 1,100 grams of vinyl acetate and 60 percent of the potassium persulfate solution were introduced over a period of 210 minutes. When the addition of vinyl acetate was terminated, the remaining 15 percent of the catalyst solution were rapidly added to the reaction mixture and heating was continued for 90 minutes at an internal temperature of 80 C. The supply of ethylene was discontinued and the latex obtained was cooled to room temperature. a finely disperse, low viscous dispersion being free from coagulate and having a solids content of about 50 percent was obtained. The polymer of the dispersion contained approximately 9 percent of ethylene. From the dispersion a transparent, homogenous, and flexible film was obtained which was completely soluble in organic solvents. The water-extractible portion amounted to about 5 percent, calculated on the solids content of the dispersion. When a 0.8 mm thick film was exposed for 6 hours to the radiation of a xenon lamp, the water-extractable portion was reduced to 1.2 percent.

EXAMPLE 5

A 5 liter reactor was charged with the aqueous reaction mixture specified in Example 4. The reactor was scavenged with nitrogen, the stirrer was set in motion and the polymerization mixture was heated at 80°C. At 80°C there were added to the reaction mixture 10 percent of a monomer mixture consisting of 1,225 grams of vinyl acetate and 65 grams of octene-(1) and 25 percent of a catalyst solution of 5.5 grams of potassium persulfate and 150 grams of water. Polymerization set in after a short period of time. The remaining 90 percent of the monomer mixture and 60 percent of the catalyst mixture were uniformly metered in over a period of 4 hours at an internal temperature of 80°C. The addition of the monomer mixture being terminated, the remaining 15 percent of the potassium persulfate solution were added to the mixture and simultaneously the internal temperature was raised to 85°C. The reaction mixture was heated for a further 90 minutes and then cooled. The dispersion having a solids content of 50 percent formed a flexible film which was soluble in organic solvents and the water-extractible portion of which amounted to about 5percent. When being exposed to light radiation (xenon lamp, 6 hours), the water-extractible portion was reduced to about 0.8 percent.

EXAMPLE 6

In the manner described in Example 1, an aqueous polymerization mixture, adjusted to a pH of 5.0 by means of sodium hydroxide and consisting of 5 parts of a hydroxyethylation product of 1 mole of nonyl phenol with 7 moles of ethylene oxide, 1.5 parts of the sodium salt of the sulfuric acid semi-ester of the hydroxyethylation product of 1 mole of lauryl alcohol with 2 moles of ethylene oxide, 0.2 part of sodium acetate, 1.5 parts of acrylic acid and 105 parts of water, was heated at 80°C. 0.1 part of ammonium persulfate in 1 part of water was then added and a monomer mixture of 50 parts of styrene, 48.5 parts of acrylic acid n-butyl ester and 1.5 parts of acrylic acid was metered in over a period of 2 hours at an internal temperature of 80°C. After a metering period of 1 hour, 0.1 part of ammonium persulfate in 1 part of water was added, the same amount of catalyst being added when metering was terminated. When the addition was terminated, the reaction mixture was heated for 4 hours at an internal temperature of 85°C and then cooled.

The about 50 percent finely disperse and coagulate-free dispersion formed a transparent and flexible film from which about 4.5 parts could be extracted by a treatment with boiling water for 4 hours. By a four hour irradiation with a xenon lamp the water-extractible portion was reduced to 0.7 percent.

COMPARATIVE EXAMPLE

In the manner described in Example 1, a mixture consisting of 12 in parts of a hydroxyethylation product of 1 mole of nonyl phenol with 30 moles of ethylene oxide, 0.15 part of the sodium salt of vinylsulfonic acid, 0.25 part of sodium acetate, 1.5 parts of poly(vinyl pyrrolidone) and 0.42 part of potassium persulfate in 109 parts of water was heated at 80°C. A monomer mixture of 67 parts of vinyl acetate, 33 parts of vinyl esters of a mixture of aliphatic carboxylic acids branched in α-position and having nine to 11 carbon atoms (boiling point 205° to 262°C at 760 mm Hg) and 3 parts of benzophenone was then added dropwise over a period of 3 hours. The addition being terminated, a solution of 0.1 part of potassium persulfate in 5 parts of water was added and the whole was heated for a further 2 hours. The reaction mixture was then cooled to room temperature. The water-extracable portion of a film produced from the about 50 percent dispersion amounted to about 6.5 percent. The water-extractable portion could not be reduced by irradiating the film with an ultra-violet lamp, a xenon lamp, or daylight.

We claim:

1. A process for producing an aqueous dispersion of a polymer which comprises emulsion-polymerizing, in the presence of a water-soluble free radical polymerization catalyst, a monomer selected from the group consisting of an ester of vinyl alcohol and a linear or branched aliphatic carboxylic acid having one to 18 carbons atoms, an ester of acrylic or methacrylic acid and a linear or branched monohydric aliphatic saturated alcohol having one to 18 carbon atoms, together with up to 50 percent, calculated on the weight of the total monomer mixture, of at least one olefinically unsaturated monomer copolymerizable with said ester and selected from the group consisting of ethylene, isobutylene and higher α-olefins having up to 12 carbon atoms, styrene, acrylonitrile and an ester of maleic or fumaric acid and a saturated aliphatic monohydric alcohol having one to 10 carbon atoms, and up to 5 percent, calculated on the weight of the total mixture of monomers, of at least one unsaturated carboxylic acid, vinyl sulfonic acid, vinyl phosphonic acid or an alkali salt thereof, wherein the polymerizing is carried out at a temperature of from 20° to 90°C and at a pH value of from 3 to 9, in the presence of an non-ionic, anionically active or cationically active emulsifier or a combination thereof and in the presence of a protective colloid selected from the group consisting of poly (vinyl alcohol), poly (vinyl pyrrolidone), poly (acrylamide) and poly (methacrylamide), said emulsion-polymerizing being carried out in the presence of 1 to 15 percent, calculated on the weight of the monomer or monomers, of at least one light-sensitive non-ionic emulsifier of the formula

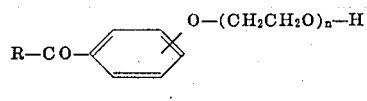

wherein R represents a phenyl group, n represents an integer within the range of 1 to 200, the total weight of the emulsifier and the protective colloid not exceeding the weight of said light-sensitive emulsifier, said polymer being cross-linkable under the action of light of a wave length within the range of from 2,000 to 8,000 A.

2. The process as claimed in claim 1, carried out in the presence of a light-sensitive emulsifier of the aforesaid formula in which n represents an integer within the range of from 4 to 60.

3. The process as claimed in claim 1, wherein vinyl acetate is polymerized.

4. The process as claimed in claim 1, wherein a vinyl ester of a saturated aliphatic carboxylic acid branched in α-position and having four to 11 carbon atoms is polymerized.

5. The process as claimed in claim 1, wherein an ester of acrylic acid and a monohydric aliphatic saturated alcohol having four to eight carbon atoms is polymerized.

6. The process as claimed in claim 1, wherein an ester of methacrylic acid and a monohydric aliphatic saturated alcohol having four to eight carbon atoms is polymerized.

7. A process for producing an aqueous dispersion of a polymer which comprises emulsion-polymerizing, in the presence of a water-soluble free radical polymerization catalyst, a monomer selected from the group consisting of an ester of vinyl alcohol and a linear or branched aliphatic carboxylic acid having one to 18 carbon atoms, an ester of acrylic or methacrylic acid and a linear or branched monohydric aliphatic saturated alcohol having one to 18 carbon atoms, together with up to 50 percent, calculated on the weight of the total monomer mixture, of at least one olefinically unsaturated monomer copolymerizable with said ester and selected from the group consisting of ethylene, isobutylene and higher α-olefins having up to 12 carbon atoms, styrene, acrylonitrile and an ester of maleic or fumaric acid and a saturated aliphatic monohydric alcohol having one to 10 carbon atoms, wherein the polymerizing is carried out at a temperature of from 20° to 90°C. and at a pH value of from 3 to 9, in the presence of an non-ionic, anionically active or cationically active emulsifier or a combination thereof and in the presence of poly (vinyl pyrrolidone), said emulsion-polymerizing being carried out in the presence of 1 to 15 percent, calculated on the weight of the monomer or monomers, of at least one light-sensitive non-ionic emulsifier of the formula

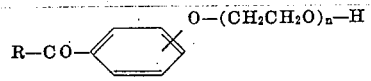

wherein R represents a phenyl group, $n$ represents an integer within the range of 1 to 20, the total weight of the emulsifier and the poly (vinyl pyrrolidone) not exceeding the weight of said light-sensitive emulsifier, said polymer being cross-linkable under the action of light of a wave length within the range of from 2,000 to 8,000 A.

* * * * *